United States Patent
Winkelmann et al.

(10) Patent No.: US 10,597,139 B2
(45) Date of Patent: Mar. 24, 2020

(54) LATCHING DEVICE FOR A FOLDABLE WING ARRANGEMENT

(71) Applicants: Airbus Operations GmbH, Hamburg (DE); Airbus Operations Ltd., Bristol (GB)

(72) Inventors: Christoph Winkelmann, Hamburg (DE); Johannes Rupp, Hamburg (DE); Benjamin Bishop, Bristol (GB)

(73) Assignees: Airbus Operations Limited, Bristol (GB); Airbus Operations GmbH, Hamburg (DE)

( * ) Notice: Subject to any disclaimer, the term of this patent is extended or adjusted under 35 U.S.C. 154(b) by 375 days.

(21) Appl. No.: 15/619,126

(22) Filed: Jun. 9, 2017

(65) Prior Publication Data

US 2017/0355443 A1    Dec. 14, 2017

(30) Foreign Application Priority Data

Jun. 9, 2016   (EP) .................................. 16173836

(51) Int. Cl.
    *B64C 3/56*    (2006.01)
(52) U.S. Cl.
    CPC .................. *B64C 3/56* (2013.01); *Y02T 50/14* (2013.01)
(58) Field of Classification Search
    CPC ............ B64C 3/56; B64C 27/50; Y02T 50/14
    See application file for complete search history.

(56) References Cited

U.S. PATENT DOCUMENTS

| 2,925,233 | A | | 2/1960 | Dunn et al. | |
|---|---|---|---|---|---|
| 5,201,479 | A | * | 4/1993 | Renzelmann | B64C 3/56 244/49 |
| 5,381,986 | A | | 1/1995 | Smith et al. | |
| 5,427,329 | A | * | 6/1995 | Renzelmann | B64C 3/56 244/49 |
| 5,452,643 | A | * | 9/1995 | Smith | B64C 3/56 475/332 |
| 2015/0014478 | A1 | * | 1/2015 | Lassen | B64C 3/56 244/49 |

(Continued)

FOREIGN PATENT DOCUMENTS

| CN | 204 461 240 | 7/2015 |
|---|---|---|
| EP | 2 676 878 | 12/2013 |

OTHER PUBLICATIONS

Search Report for EP16173836.4 dated Dec. 7, 2016, 7 pages.

*Primary Examiner* — Rodney A Bonnette
(74) *Attorney, Agent, or Firm* — Nixon & Vanderhye P.C.

(57) ABSTRACT

A latching device for a wing including a support structure (29), a latching bolt (35) having a longitudinal axis (36) and being slidably supported by the support structure (29) such that the latching bolt (35) is movable between a retracted position and an extended position. The latching device (27) includes a first hydraulic actuator (47a) and a first connector assembly (38a) adapted to be connected to a first hydraulic system of an aircraft (1), and at least one second hydraulic actuator (47b) and a second connector assembly (38b) connected to a second hydraulic system. The first hydraulic actuator (47a) and the second hydraulic actuator (47b) are adapted to effect movement of the latching bolt (35) from the extended position into the retracted position independent of the other one of the at least one first hydraulic actuator (47a) and the at least one second hydraulic actuator (47b).

13 Claims, 6 Drawing Sheets

(56) References Cited

U.S. PATENT DOCUMENTS

2015/0298793 A1* 10/2015 Fox .......................... B64C 3/56
                                                    244/49
2017/0355441 A1* 12/2017 Winkelmann ............ B64C 3/56
2017/0355442 A1* 12/2017 Winkelmann ............ B64C 3/56
2017/0355444 A1* 12/2017 Lorenz ..................... B64C 3/56

* cited by examiner

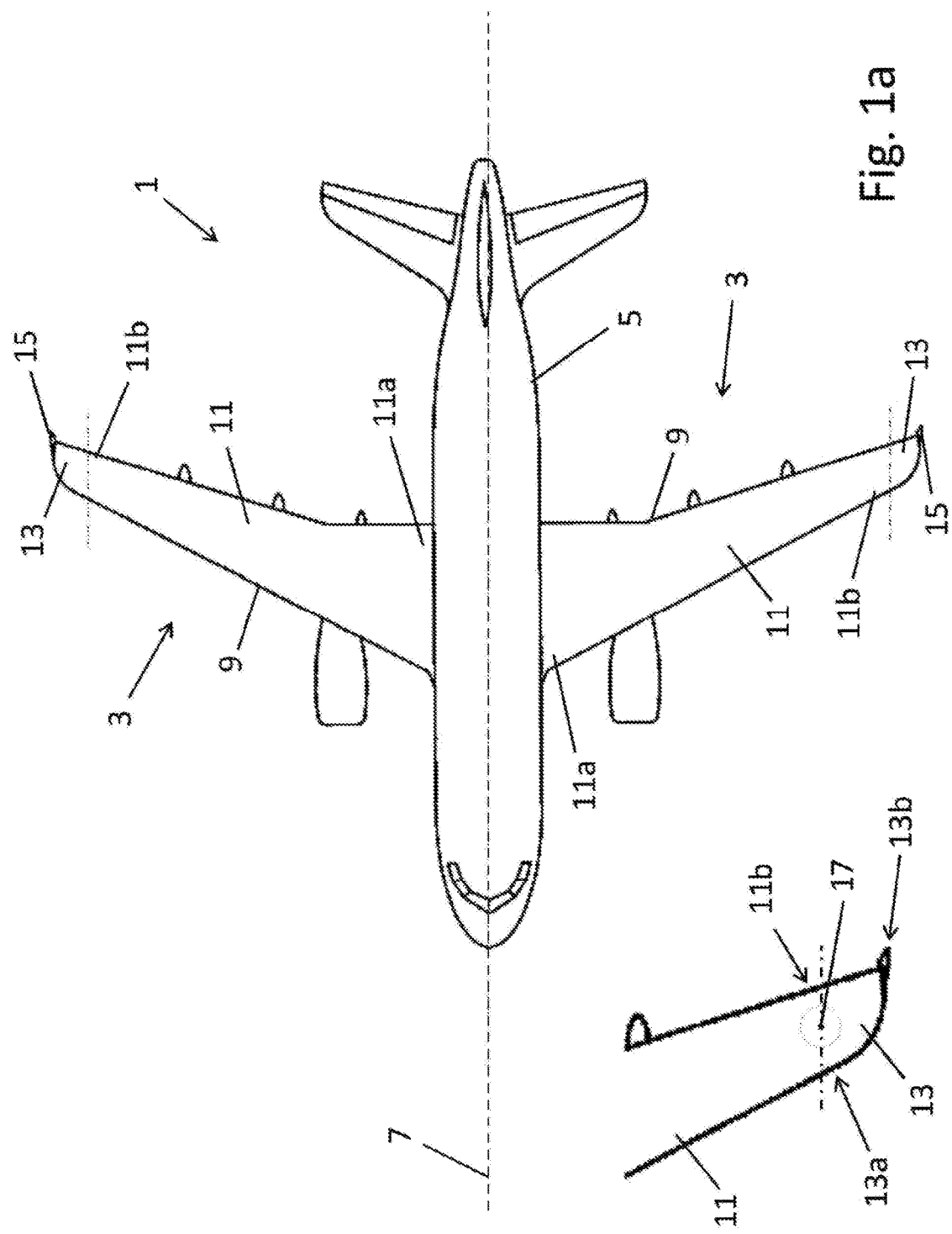

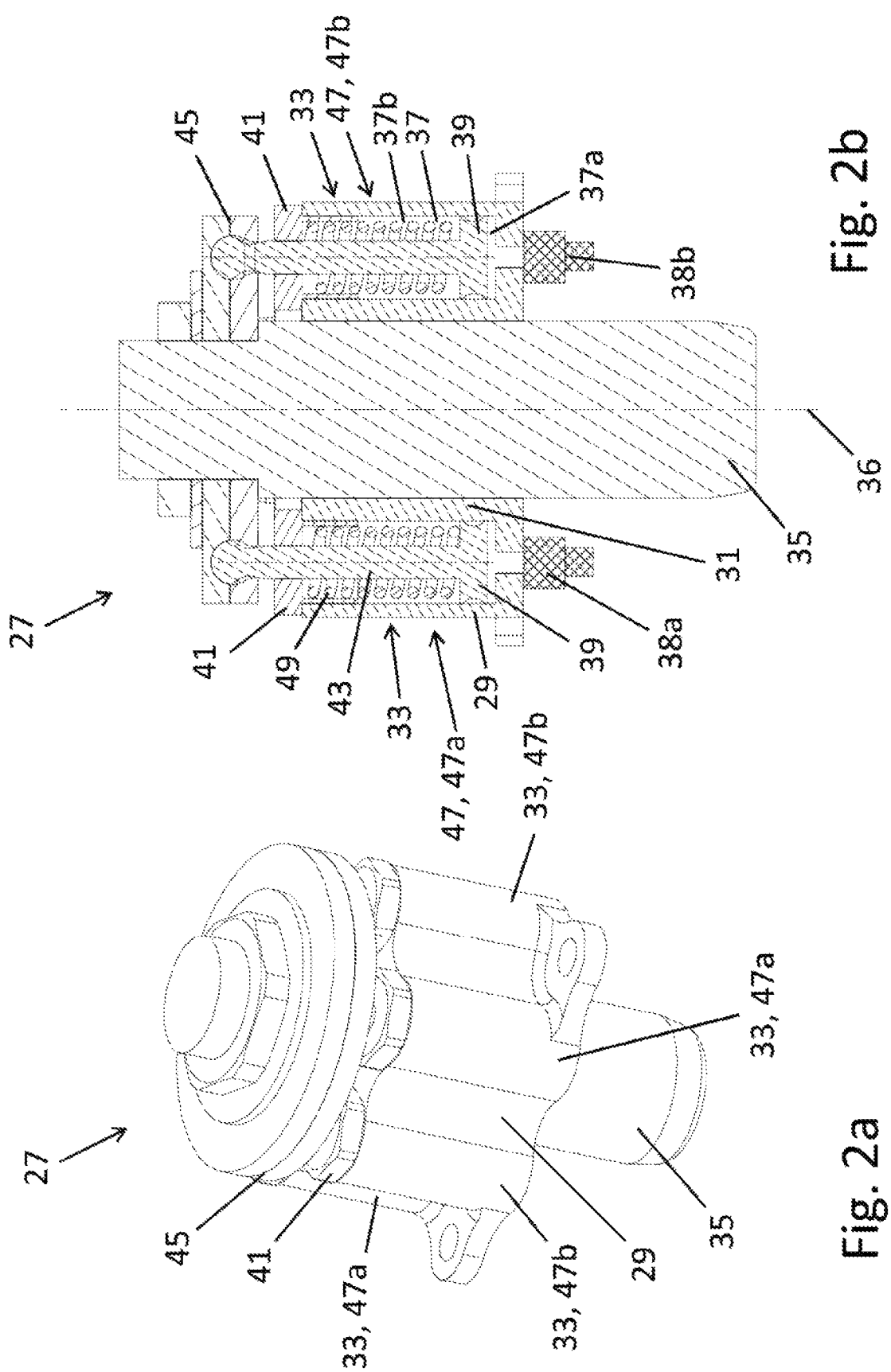

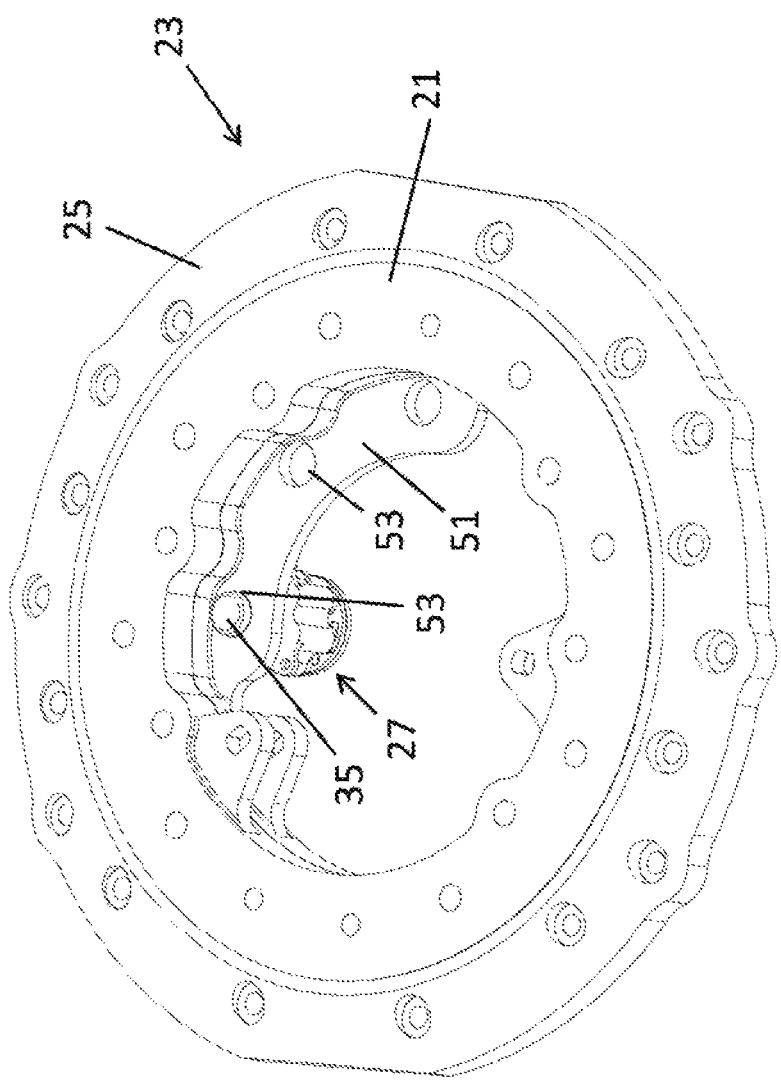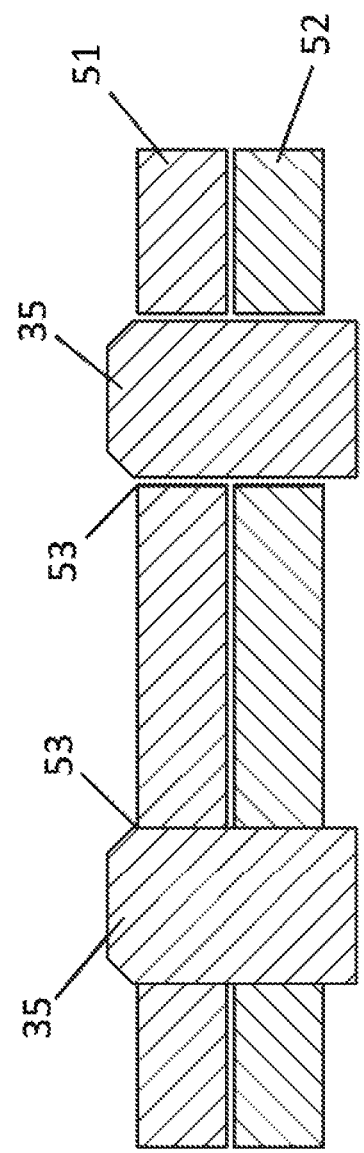
Fig. 3a
Fig. 3b

LATCHING DEVICE FOR A FOLDABLE WING ARRANGEMENT

RELATED APPLICATION

This application claims priority to and incorporates by reference European Patent Application 16173836.4 filed Jun. 9, 2016.

BACKGROUND AND SUMMARY OF INVENTION

The present invention relates a latching device for a wing arrangement for an aircraft, which wing arrangement includes a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position.

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end portion of the wing between a deployed position, in which the wing has its normal flight configuration, and a stowed position, in which the wing has a folded configuration and the wingspan is decreased as compared to the deployed position. It is necessary to provide a latching device which is able to safely retain the outboard end portion in the deployed position or in the stowed position or in both positions, as long as the respective position is desired.

A latching device is disclosed for a wing arrangement having a foldable wing, which latching device is safe and reliable in operation and at the same time of a simple construction.

According to the present invention a latching device for a particular wing arrangement for an aircraft is provided.

This wing arrangement comprises a wing having a base section and a tip section. The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable about a pivot axis between a deployed position and a stowed position in which the spanwise length of the wing is smaller than in the deployed position. In other words, when two of the wings are mounted to opposite sides of a fuselage of an aircraft, the length of the shortest straight line between the outermost wingtips of the two wings is larger—and preferably maximized—in the deployed position than in the stowed position. In particular, the distance between the first end portion and the fourth end portion may be larger—and preferably maximized—in the deployed position than in the stowed position.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

It is to be noted that, in case the wing includes a wing tip device, the tip section may be identical to the wing tip device, but that it is preferred that the tip section comprises the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The latching device comprises a support structure. The support structure may, for example, be or comprise a housing or casing. Such housing or casing may preferably comprise an interior cavity and an opening at which the interior cavity is open towards an exterior of the housing.

In any case, the latching device also comprises a latching bolt having a longitudinal axis and being slidably supported by the support structure in such a manner that the latching bolt is movable between a retracted position and an extended position, wherein in the extended position the latching bolt extends further from the support structure than in the retracted position. In case of the above-mentioned examples in which the support structure is or comprises a housing the latching bolt is supported on or by the housing or casing and may preferably be received at least partially in the interior cavity.

Moreover, the latching device comprises one or more first—preferably linear—hydraulic actuators and one or more first connector assemblies adapted to be connected to a first hydraulic system of an aircraft and to supply the one or more first hydraulic actuators with pressurized hydraulic fluid. Each of the first connector assemblies may preferably include two ports for connection to two hydraulic lines. It is to be noted that each of the one or more first hydraulic actuators or some of the one or more first hydraulic actuators may have an own separate first connector assembly. However, it is preferred if the latching device has only a single first connector assembly which is common to all first hydraulic actuators, and that the pressurized fluid supplied via such common first connector assembly is distributed among the first hydraulic actuators by corresponding hydraulic lines, which are part the latching device and connected between the common first connector assembly and each of the one or more first hydraulic actuators. In any case, it is to be noted that the first hydraulic system of an aircraft mentioned above may be a hydraulic system of the aircraft which is operable to supply a plurality of consumers of the aircraft with pressurized hydraulic fluid, or may be a hydraulic system specifically provided for the latching device or for a plurality of the latching devices in a wing arrangement.

The latching device also comprises one or more second—preferably linear—hydraulic actuators and one or more second connector assemblies adapted to be connected to a second hydraulic system of an aircraft and to supply the one or more second hydraulic actuators with pressurized hydraulic fluid, i.e. hydraulic pressure. The one or more first connector assemblies are separated from the one or more second connector assemblies. Thus, the one or more first hydraulic actuators and the one or more second hydraulic actuators are thereby connectable to and operable by two separate hydraulic systems. Each of the second connector assemblies may preferably include two ports for connection to two hydraulic lines. It is to be noted that each of the one or more second hydraulic actuators or some of the one or more second hydraulic actuators may have an own separate second connector assembly. However, it is preferred if the latching device has only a single second connector assembly which is common to all second hydraulic actuators, and that the pressurized fluid supplied via such common second connector assembly is distributed among the second hydraulic actuators by corresponding hydraulic lines, which are part the latching device and connected between the common second connector assembly and each of the one or more second hydraulic actuators. In any case, it is to be noted that the second hydraulic system of an aircraft mentioned above may be a hydraulic system of the aircraft which is operable to supply a plurality of consumers of the aircraft with pressurized hydraulic fluid, or may be a hydraulic system specifically provided for the latching device or for a plurality of the latching devices in a wing arrangement.

The one or more first hydraulic actuators and the one or more second hydraulic actuators are adapted to effect movement of the latching bolt from the extended position into the retracted position independent of the other one of the one or more first hydraulic actuators and the one or more second hydraulic actuators. In other words, the one or more first hydraulic actuators are adapted and capable to effect movement of the latching bolt from the extended position into the retracted position without operation of the one or more second hydraulic actuators, and, similarly, the one or more second hydraulic actuators are adapted and capable to effect movement of the latching bolt from the extended position into the retracted position without operation of the one or more first hydraulic actuators.

The above-described latching device is of a simple construction and is nevertheless capable of providing for reliable latching of a tip section of a wing arrangement of the type likewise already described above. The latching device further provides for redundancy for the operation of the latching bolt, because each of the one or more first hydraulic actuators may be operated separately from the one or more second hydraulic actuators by connecting them to separate and different hydraulic power supplies. The latching may achieved in a simple manner by securing the support structure of the latching device to one of the tip section and the base section of the wing arrangement and by providing one or more engagement portions for the latching bolt, such as one or more bores, on the other one of the tip section and the base section in such a manner that if the tip section is in the deployed position and/or in the stowed position the latching bolt is positioned to engage or extend into a respective one of the one or more engagement portions in the extended position of the latching bolt, whereas in the retracted position the latching bolt is disengaged from the respective one of the one or more engagement portions so as to allow for relative movement between the tip section and the base section.

In a preferred embodiment, the latching device comprises a plurality of the first hydraulic actuators and a plurality of the second hydraulic actuators. This provides for further redundancy, allows the individual hydraulic actuators to have smaller dimensions and provides the possibility to arrange the hydraulic actuators so as to decrease or minimize the risk of wedging of the latching bolt. In the latter regard, it is further preferred if the plurality of first hydraulic actuators are symmetrically arranged around the longitudinal axis of the latching bolt with an angular distance between each two adjacent first hydraulic actuators being the same, and the plurality of second hydraulic actuators are symmetrically arranged around the longitudinal axis of the latching bolt with an angular distance between each two adjacent second hydraulic actuators being the same. For example, three first hydraulic actuators with angular distances of 120° and three first hydraulic actuators with angular distances of 120° may be provided around or surrounding the latching bolt.

In a preferred embodiment, the latching device further comprises a biasing arrangement. The biasing arrangement is arranged and adapted to bias the latching bolt into the extended position and, preferably, to move the latching bolt from the retracted position into the extended position.

In this embodiment it is further preferred that the biasing arrangement comprises one or more springs, such as, e.g., one or more compression springs or one or more Belleville washers. For each of the one or more first hydraulic actuators and each of the one or more second hydraulic actuators one of these springs—or possibly more than one of these springs—is located inside a cylinder chamber of a cylinder of the respective hydraulic actuator and supported between a piston of the respective hydraulic actuator and a spring support portion of the cylinder. Alternatively or additionally, one of these springs—or possibly more than one of these springs—is located surrounding or around a portion of the latching bolt, such as, e.g., inside the interior cavity of the housing or casing if the support structure constitutes a housing or casing, and supported between a first spring support portion fixedly connected to the latching bolt and a second spring support portion which is immovable with respect to the support structure, such as a portion of the support structure. Further alternatively or additionally, one of these springs—or possibly more than one of these springs—is located inside a recess provided in the latching bolt and extending from one longitudinal end of the latching bolt and supported between a bottom of the recess opposite the longitudinal end and a spring support portion which is immovable with respect to the support structure, such as a portion of the support structure.

In any of the above-described embodiments comprising a biasing arrangement, one or more or all of the one or more first hydraulic actuators and/or one or more or all of the one or more second hydraulic actuators may be a single acting hydraulic actuator. In this case the biasing arrangement must be able to move the latching bolt into the extended position without support by the first and second hydraulic actuators.

Alternatively and additionally, and independent of whether or not a biasing arrangement is present, one or more or preferably all of the one or more first hydraulic actuators and/or one or more or preferably all of the one or more second hydraulic actuators is a double acting hydraulic actuator. The one or more first double acting hydraulic actuators and the one or more second double acting hydraulic actuators are then adapted to be operable to exert a force to the latching bolt to effect movement of the latching bolt from the retracted position into the extended position (or at least assist such movement, if a biasing arrangement is present which is adapted to effect this movement together with the one or more first double acting hydraulic actuators or the one or more second double acting hydraulic actuators) independent of the other one of the one or more first double acting hydraulic actuators and the one or more second double acting hydraulic actuators. In other words, the one or more first double acting hydraulic actuators are adapted and capable to effect (or at least assist) movement of the latching bolt from the retracted position into the extended position without operation of the one or more second double acting hydraulic actuators, and, similarly, the one or more second double acting hydraulic actuators are adapted and capable to effect (or at least assist) movement of the latching bolt from the retracted position into the extended position without operation of the one or more first double acting hydraulic actuators. Provided that the one or more first double acting hydraulic actuators are adapted and capable to effect movement of the latching bolt from the retracted position into the extended position and the one or more second double acting hydraulic actuators are adapted and capable to effect (or at least assist) movement of the latching bolt from the retracted position into the extended position, the latching device does not require a biasing arrangement. Nevertheless, the biasing arrangement may still be provided for prepositioning the latching bolt and/or to supplement the action of the first and second double acting hydraulic actuators.

It is to be noted that it is in principle also possible to have, instead of one or more first and second double acting hydraulic actuators and in addition to the one or more first single acting hydraulic cylinders and the one or more second single acting hydraulic cylinders one or more third single acting hydraulic cylinders and one or more fourth single acting cylinders, which are adapted to effect (or at least assist) the movement of the latching bolt from the retracted position into the extended position in the manner described above for the one or more first double acting hydraulic cylinders and the one or more second double acting hydraulic cylinders. These third and fourth hydraulic cylinders would then be connected to the one or more first connector assemblies and the one or more second connector assemblies, respectively. However, such separate single acting hydraulic actuators require additional space, so that the provision of double acting hydraulic actuators is preferred.

In a preferred embodiment, the latching bolt comprises or is fixedly attached to one or more hydraulic actuator engagement portions, each of which is extending transversely, and preferably—at least with a part thereof—perpendicularly, with respect to the longitudinal axis. Each of the one or more first hydraulic actuators and each of the one or more second hydraulic actuator engages or is secured to at least one the one or more hydraulic actuator engagement portions—and preferably to the perpendicularly extending part thereof, if present—to thereby effect the movement of the latching bolt from the extended position into the retracted position, and possibly, as the case may be, also from the retracted position into the extended position, upon actuation of the one or more first hydraulic actuators or the one or more second hydraulic actuators, as described in detail above.

In a preferred embodiment, the latching device further comprises one or more locking mechanisms—and possibly two or more for reasons of redundancy—each having a locking element which is selectively movable between a locking position and an enabling position. Each such locking mechanism and the corresponding locking element are configured and arranged such that when the latching bolt is in the extended position and the locking element is moved from the enabling position to the locking position the locking element engages the latching bolt or a component secured thereto and prevents the latching bolt from moving out of the extended position. Conversely, when the latching bolt is in the extended position and the locking element is moved from the locking position to the enabling position it no longer prevents the latching bolt from moving from the extended position into the retracted position. The locking element may be or comprise, e.g., a cam element connected to a rotatable shaft, i.e., the locking mechanism comprises a rotatable shaft with a radially extending projection constituting or forming part of the locking element. For example, the rotatable shaft may extend transversely and preferably perpendicularly with respect to the longitudinal axis of the latching bolt such that it is spaced from an end face of a longitudinal end of the latching bolt or a component secured to the longitudinal end of the latching bolt, both in the retracted and in the extended position of the latching bolt. This longitudinal end is the longitudinal end, which moves away from the rotatable shaft when the latching bolt moves from the retracted position into the extended position. The cam element or projection is then arranged such that upon rotation of the rotatable shaft in the extended position of the latching bolt, the cam element or projection "fills" the gap between the end face of the latching bolt or the component and the rotatable shaft and abuts the end face of the latching bolt or the component, such that the latching bolt is prevented from moving out of the extended position. Advantageously, locking and unlocking of the latching bolt may then be effected by rotating the rotatable shaft in a single direction only. If the locking mechanism comprises a rotatable shaft, the latching device then preferably also comprises one or more bearings for the rotatable shaft.

In the above embodiments, in which the latching device comprises one or more locking mechanisms, it is further preferred if each of these locking mechanisms further comprises a—preferably hydraulically or electrically powered—locking actuator operable to move the locking element between the locking position and the enabling position, and preferably both from the locking position into the enabling position and from the enabling position into the locking position. Preferably, for reasons of redundancy each locking mechanism comprises two of these locking actuators, which are adapted to independently effect the above movement or movements of the locking element, e.g. two locking actuators which are independently able to effect rotation of the rotatable shaft in the above-described example of a locking mechanism including a rotatable shaft.

It is to be noted that a separate locking arrangement is not be necessary and may be dispensed with if the above-described biasing arrangement is present and is adapted to be sufficiently strong to retain the latching bolt in the extended position under the intended operating conditions of the latching device.

In accordance with the purpose of the above-described latching device, one or more of the latching devices may be part of a wing arrangement for an aircraft. The wing arrangement is of the construction already described in detail above. Thus, to summarize briefly, it comprises a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the distance between the first end portion and the fourth end portion is smaller than in the deployed position. For further details, reference is made to the above extensive explanations.

The first connector assembly of each of the one or more latching devices is connected or connectable to a first hydraulic system of an aircraft and the second connector assembly of each of the one or more latching devices is connected or connectable to a second hydraulic system of an aircraft. In this regard it is to be noted that the first hydraulic system of an aircraft and the second hydraulic system of an aircraft may be a hydraulic system of an aircraft adapted to supply a plurality of consumers of the aircraft with pressurized hydraulic fluid, or may be a local hydraulic system provided as part of the wing arrangement, which local hydraulic system locally generates or provides hydraulic pressure, for example, via an electric motor and a hydraulic pump. Of course, it is also possible that the first hydraulic system is of one of these types and the second hydraulic system is of the other of these types.

In any case, for each of the one or more latching devices, the support portion of the respective latching device is secured to one of the second end portion and the third end portion and the other of the second end portion and the third end portion comprises one or two bores, i.e. a first bore and/or a second bore.

Each of these bores is arranged such that in the deployed position of the tip section the respective bore is aligned with the latching bolt of the respective latching device such that the latching bolt is movable into engagement with the respective bore by moving it into the extended position and out of engagement with the respective bore by moving it into the retracted position, or such that in the stowed position of the tip section the respective bore is aligned with the latching bolt of the respective latching device such that the latching bolt is movable into engagement with the respective bore by moving it into the extended position and out of engagement with the respective bore by moving it into the retracted position. It is then possible that separate ones of the latching devices are utilized for latching the tip section in the deployed position and in the stowed position, wherein for one or more of the latching devices the respective bore is aligned with the latching bolt in the deployed position of the tip section and for one or more different ones of the latching devices the respective bore is aligned with the latching bolt in the stowed position of the tip section. It is also possible that the latching device or devices are only arranged and operable to latch the tip section in the deployed position, and that separate means must be provided for latching the tip section in the stowed position.

In case of two of such bores, i.e. if a first and a second bore are present for each of the one or more latching devices, the first bore and the second bore are arranged such that in the deployed position of the tip section the first bore is aligned with the latching bolt of the respective latching device such that the latching bolt is movable into engagement with the first bore by moving it into the extended position and out of engagement with the first bore by moving it into the retracted position, and in the stowed position of the tip section the second bore is aligned with the latching bolt of the respective latching device such that the latching bolt is movable into engagement with the second bore by moving it into the extended position and out of engagement with the second bore by moving it into the retracted position. This arrangement is particularly advantageous because the latching device or devices are adapted to effect latching in both the deployed and stowed positions, so that the total number of latching devices required as part of the wing arrangement may be reduced.

In any case, for each of the latching devices, when the latching bolt is in engagement with one of the one or two associated bores it prevents movement of the tip section out of the deployed position or the stowed position, as the case may be. Thus, with a single associated bore, i.e. a first bore or a second bore, it prevents movement of the tip section out of the deployed position or out of the stowed position, depending on the position of the respective bore. If two bores are present, i.e. a first bore and a second bore, the latching bolt prevents movement of the tip section out of the deployed position when the latching bolt is in engagement with the first bore, and the latching bolt prevents movement of the tip section out of the stowed position when the latching bolt is in engagement with the second bore. The latching bolt may have a tapered design or a tapered tip portion in order to facilitate entry of the latching bolt into the associated bore or bores and to provide for some degree of self-alignment.

In a preferred embodiment the wing arrangement comprising two or more of the latching devices for the deployed position of the tip section or for both the deployed and stowed positions of the tip section, for reasons of redundancy. Then the latching bolts of the latching devices and the associated bores may be dimensioned such that in each of these positions only one or only some of the latching bolts have a diameter matching the diameter of the associated bore or bores in the extended position of the latching bolt, whereas another one or others of the latching bolts have diameters smaller than the associated bore or bores. The first-mentioned latching bolt or bolts then constitute a primary latching bolt or primary latching bolts, and the latter latching bolt or bolts then constitute a primary latching bolt or secondary latching bolts. Unless the primary latching bolt or bolts fail, the secondary latching bolt or bolts do not carry load and only become responsible for the latching in case the primary latching bolt or bolts fail. In this way a more exact definition of the load path may be implemented.

The wing arrangement according to any of the above-described embodiments may be part of an aircraft. The aircraft further comprises a fuselage, wherein the first end portion of the base section is attached to the fuselage and the base section is arranged between the fuselage and the tip section, and a first hydraulic system and a separate second hydraulic system, i.e. the second hydraulic system is independent or not in fluid communication with the first hydraulic system. Each of the first and second hydraulic systems may be a hydraulic system which is adapted and operable to supply a plurality of consumers of the aircraft with pressurized hydraulic fluid or may be a hydraulic system specifically provided for the latching device or for a plurality of the latching devices in the wing arrangement—and possibly also for other consumers in the wing arrangement, but not for consumers outside the wing arrangement. In the latter type of hydraulic system the hydraulic pressure may be provided, e.g., by a motor driving a hydraulic pump.

In any case, the one or more first connector assemblies of the one or more first hydraulic actuators are connected to, i.e. in fluid communication with, the first hydraulic system and the one or more second connector assemblies of the one or more second hydraulic actuators are connected to, i.e. in fluid communication with, the second hydraulic system.

In a preferred embodiment the first hydraulic system is operable to supply a plurality of consumers of the aircraft with pressurized hydraulic fluid, and the second hydraulic system is operable to supply a plurality of consumers of the aircraft with pressurized hydraulic fluid.

SUMMARY OF THE DRAWINGS

In the following exemplary embodiments of the present invention will be explained in detail with reference to the drawings.

FIG. 1a shows a schematic top view of an aircraft for use in which the embodiments of the latching device according to the present invention are adapted.

FIG. 1b shows a top view of a wing arrangement of the aircraft of FIG. 1a.

FIG. 1c an enlarged view of the wing tip region shown in FIG. 1a.

FIG. 2a shows a perspective view of a latching device according to a first embodiment of the present invention.

FIG. 2b shows a cross-sectional view of the latching device of FIG. 2a.

FIG. 3a shows a partial perspective view of a connection between two end portions of a base section and a tip section, respectively, of the wing arrangement shown in FIG. 1b.

FIG. 3b shows a partial cross-sectional view of FIG. 3a.

DETAILED DESCRIPTION OF THE INVENTION

Figure 1B:
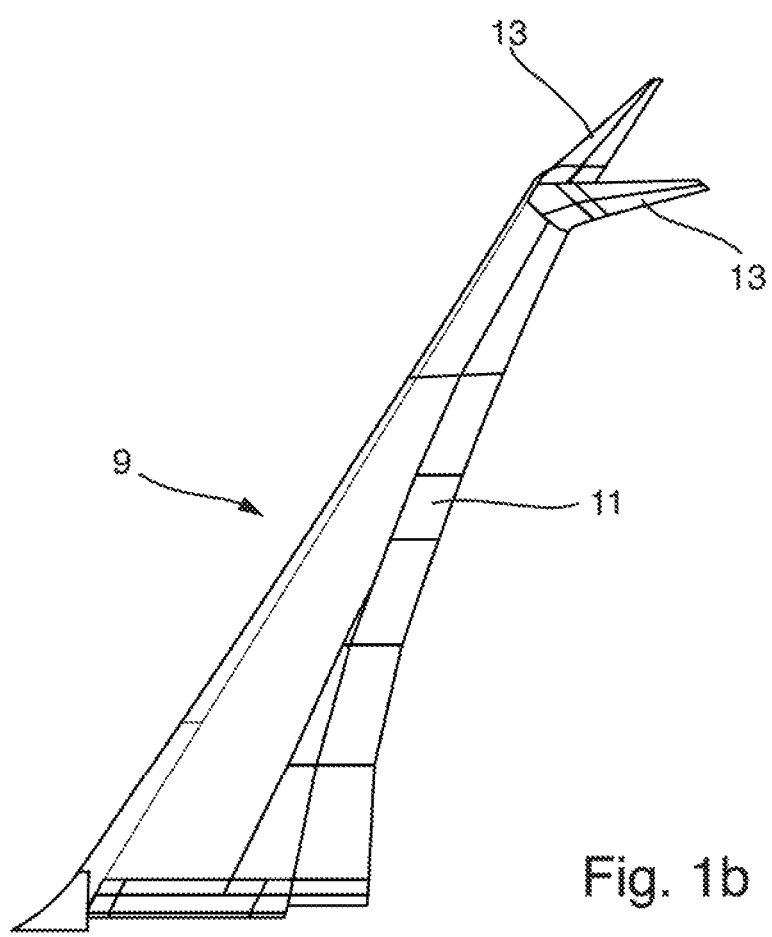

FIGS. 1a and 1c show a schematic top view of an aircraft 1 having two wing arrangements 3 including two or more latching devices according to the present invention (not visible in FIG. 1a). The aircraft 1 also comprises a fuselage 5 extending along a longitudinal axis 7 which corresponds to the x-axis of the aircraft 1. Each of the wing arrangements 3 comprises a wing 9 that extends away from the fuselage 5, and each wing 9 comprises a base section 11 and a tip section 13. The base section 11 has a first or inboard end portion 11a, which is configured or adapted to be coupled to the fuselage 5 and is shown to be coupled to the fuselage 5, and an opposite second or outboard end portion 11b spaced from the fuselage 5 by the remainder of the base section 11.

The tip section 13 of the wing 9 is pivotably connected to the second end portion 11b of the base section 11. More particularly, the tip section 13 extends away from the second or outboard end portion 11b of the base section 11 and comprises a third or inboard end portion 13a and an opposite fourth or outboard end portion 13b spaced from the base section 11 by the remainder of the tip section 13 (as can be seen in the insert of FIG. 1a, which shows an outboard end region of one of the wings 9 in enlarged form). The fourth end portion may be provided by a part of a wing tip device 15, which itself is a part of the tip section 13. The third end portion 13a is pivotably mounted on or coupled to the second end portion 11b of the base section 11 in such a manner that the tip section 13 is able to pivot between a deployed position and a stowed position about a pivot axis 17 (see again the insert of FIG. 1a).

The pivot axis 17 generally extends vertically—or perpendicularly with respect to the plane defined by the longitudinal axis or x-axis and the pitch axis or y-axis of the aircraft 1—, but may also by tilted to some degree with respect to the z-axis or yaw axis of the aircraft 1, such as by, e.g., 15°.

In the deployed position illustrated in FIG. 1a the tip section 13 extends essentially along the longitudinal axis of the base section 11, and in the stowed position the tip section 13 is angled backwardly with respect to the longitudinal axis of the base section 11, as can be seen in FIG. 1b, so that the spanwise length of the wing 9 is decreased. Alternatively, with the same effect it may be provided that the tip section 13 is angled forwardly in the stowed position. Thus, in the deployed position the fourth end portions or the outermost outboard ends of the tip sections 13 of the wings 9 have a larger distance than in the stowed position, so that the wingspan of the aircraft 1 can be selectively decreased by moving the tip sections 13 of the wings 9 from the deployed position into the stowed position in order to allow for the use of infrastructure adapted to aircraft of such reduced wingspan and in order to save on airport fees, and increased in order to allow for reduced fuel consumption during flight.

In order to effect the pivotal movement of the tip section 13 between the deployed and the stowed positions, each of the wing arrangements 3 comprises an actuating arrangement which is able to provide pressurized hydraulic fluid to the latching devices.

As shown in FIG. 3a, the pivotable coupling between the base section 11 and the tip section 13 may advantageously include an inner ring 21 of a support bearing 23 for pivotably supporting the tip section 13 on the base section 11. The inner ring 21 is fixedly coupled with the third end portion 13a of the tip section 13 whereas an outer ring 25 of the support bearing 23 is fixed to the second end portion 11b of the base section 11. The inner and outer rings 21, 25 can be rotated with respect to each other by an actuator (not shown) of the actuating arrangement.

FIG. 2a shows a schematic perspective view of a first embodiment of a latching device 27 according to the present invention, which latching device is also visible in FIG. 3a and a cross-sectional view of which is shown in FIG. 2b. The latching device 27 is adapted and capable to latch the tip section 13 against movement with respect to the base section when the tip section 13 is either in deployed position or in the stowed position.

The latching device 27 comprises a support structure 29, which may be fixedly secured to one of the tip section 13 and the base section 11. In particular, in the example shown in FIG. 3a the support structure 29 is fixedly mounted on the second end portion 11b of the base section 11 and, e.g., in particular on the respective portion 52 of a wing box (see FIG. 3b). The support structure 29 comprises a central inner portion in the form of a hollow cylinder 31 and a plurality of—in the embodiment shown six—outer cylinder portions 33, which are uniformly or symmetrically distributed about the longitudinal axis 36 of the inner portion 31 at angles of 60° between adjacent outer cylinder portions 33. The longitudinal axes of the outer cylinder portions 33 are extending parallel to the longitudinal axis 36 of the inner portion 31.

A cylindrical latching bolt 35 having a longitudinal axis 36 is slidably supported by the support structure 29 and more specifically by the inner portion 31 thereof, in which the latching bolt 35 is received. The longitudinal axis 36 of the latching bolt 35 coincides with the longitudinal axis of the inner portion 31. Thus, the latching bolt is movable between a retracted or release position and an extended or latching position, the latter of which is shown in FIGS. 2a and 2b. In the extended position the latching bolt 35 extends further from the support structure 29 than in the retracted position in the direction of the longitudinal axis of the inner portion 31 of the support structure 29.

Each of the outer cylinder portions 33 defines a cylinder chamber 37, in which a piston 39 is slidably movable in a direction parallel to the longitudinal axis 36 of the latching bolt 35. The piston 39 sealingly divides the cylinder chamber 37 into two chamber sections 37a, 37b above and below the piston 39, which chamber sections 37a, 37b are in fluid communication with either a first connector assembly 38a or a second connector assembly 38b (see FIGS. 2a and 2b), as will be discussed in more detail below. Each cylinder chamber 37 is closed by a closure element 41, through which a respective piston rod 43 extends parallel to the longitudinal axis 36 of the latching bolt 35, which piston rod 43 extends from and is fixedly coupled to or integrally formed with the piston 39. At a longitudinal end of the piston rod 43 distal from the piston 39 the piston rod 43 is secured to a coupling plate 45, which is also secured to the rear end of the latching bolt 35 and is common to all piston rods 43 and extends perpendicularly with respect to the longitudinal axis 36 of the latching bolt 35. Thus, each of the outer cylinder portions 33 together with the respective cylinder chamber 37, piston 39, closure element 41 and piston rod 43 constitutes a separate linear hydraulic actuator 47, which may be hydraulically operated by selectively introducing pressurized hydraulic fluid into one of the chamber sections 37a, 37b and removing it from the other one of the chamber sections 37a, 37b in order to selectively extend and retract the piston rods 43. In this regard, the coupling plate 45 provides an actuator engagement portion for engagement by the piston rods 43 and for coupling the latching bolt 35 to the linear hydraulic actuators 47.

Further, in each of the cylinder chambers 37 a compression spring 49 is located in the chamber section 37b such that the piston rod 43 extends through the spring 49 and the spring 49 is supported between the piston 39 and the closure element 41. Consequently, the spring 49 applies a force to the piston 39 in the downward direction in FIGS. 2a and 2b. Due to the coupling of the piston rods 43 of all of the linear hydraulic actuators 47 to the latching bolt 35 via the coupling plate 45, the springs 49 therefore bias the latching bolt 35 into the extended position thereof and constitute a biasing arrangement.

The six linear hydraulic actuators 47 are divided into two groups 47a, 47b (i.e. the six linear hydraulic actuators 47 are three linear hydraulic actuators 47a and three linear hydraulic actuators 47b), wherein each two adjacent ones of the linear hydraulic actuators 47 belong to different ones of the groups 47a, 47b. In other words, the linear hydraulic actuators 47 from the two groups 47a, 47b alternate and adjacent ones of the linear hydraulic actuators 47 belonging to the same group 47a or 47b are symmetrically arranged around the longitudinal axis 36 of the latching bolt 35 and have an angular distance of 120° with respect to each other. Each of the two groups 47a, 47b is associated with another one of the first connector assembly 38a and the second connector assembly 38b in that the respective connector assembly 38a, 38b is in fluid communication with each of the cylinder chambers 37 of the respective group 47a, 47b. The first connector assembly 38a and the second connector assembly 38b are not in fluid communication with each other, so that the linear hydraulic actuators 47 from the first group 47a are hydraulically operable entirely independently from the linear hydraulic actuators 47 from the second group 47b.

The linear hydraulic actuators 47 from the first group 47a are adapted to effect movement of the latching bolt 35 from the extended position into the retracted position independent of the linear hydraulic actuators 47 from the second group 47b, and similarly the linear hydraulic actuators 47 from the second group 47b are adapted to effect movement of the latching bolt 35 from the extended position into the retracted position independent of the linear hydraulic actuators 47 from the first group 47a.

The linear hydraulic actuators 47 may be single acting cylinders. In that case the compression springs 49 alone—and preferably the compression springs 49 of each of the two groups 47a, 47b alone—are adapted to move the latching bolt 35 from the retracted position into the extended position, and the linear hydraulic actuators 47 are only operable to effect movement of the latching bolt 35 from the extended position into the retracted position. Alternatively, the linear hydraulic actuators 47 may be double acting cylinders. In that case the linear hydraulic actuators 47 are also adapted and operable to effect or assist movement of the latching bolt 35 from the retracted position into the extended position, and the compression springs 49 may merely have a prepositioning function.

As can be seen in FIG. 3a an engagement element in the form of an engagement plate 51 is fixedly connected to the inner ring 21 of the support bearing 23 and, hence, fixedly connected to the tip section 13. The engagement plate 51 comprises for each of preferably two or more latching devices 27 (only one is illustrated in FIG. 3a) two spaced bores 53. When the tip section 13 is in the deployed position the latching bolt 35 of the respective latching device 27 is aligned with one of the two bores 53, and when the tip section 13 is in the stowed position the latching bolt 35 of the respective latching device 27 is aligned with the other one of the two bores 53. Consequently, when the tip section 13 is in one of the deployed position and the stowed position, the latching bolt 35 can be moved from the retracted or release position to the extended or latching position by means of the springs 49 or by means of a combination of the springs 49 and the linear hydraulic actuators 47 of one of the two groups 47a, 47b (by suitably supplying pressurized hydraulic fluid via the respective connector assembly 38a or 38b into the upper chamber sections 37b), so that the latching bolt 35 engages the respective bore 53 and thereby latches the tip section 13 in the respective position. In order to release the tip section 13 and to enable pivotal movement thereof between the deployed and stowed positions, the linear hydraulic actuators 47 of one of the two groups 47a, 47b are actuated by suitably supplying pressurized hydraulic fluid via the respective connector assembly 38a or 38b into the lower chamber sections 37a to move the pistons 39 upwardly against the biasing force of the springs 49 so as to retract the latching bolt 35 out of engagement with the respective bore 53 and move it into the retracted or release position.

Due to the two separate connector assemblies 38a, 38b associated with the two separate and independently operable groups 47a, 47b of linear hydraulic actuators 47, the latching device 27 is of a simple construction, but nevertheless provides for redundancy and therefore reliability of operation. Further, due to the symmetric arrangement of the linear hydraulic actuators 47 of each of the two groups 47a, 47b the risk of wedging of the latching bolt 35 in the support structure 29 or the bores 53 is reduced.

As illustrated in FIG. 3b two latching devices 27 may be provided, each associated with a separate pair of bores 53, as described above. The bores 53 for one of the latching devices 27 have a larger diameter than the latching bolt 35 of the respective latching device 27, whereas the latching bolt 35 of the other one of the latching devices 27 is matingly received in the associated bores 53. Then, in the latched condition load is normally carried only by the latching bolt 35 of the latter latching device 27, thereby providing a defined load path, and the latching bolt 35 of the other latching device 27 only carries load and carries out the latching function in case the latching bolt 35 normally carrying the load fails.

Figure 4:
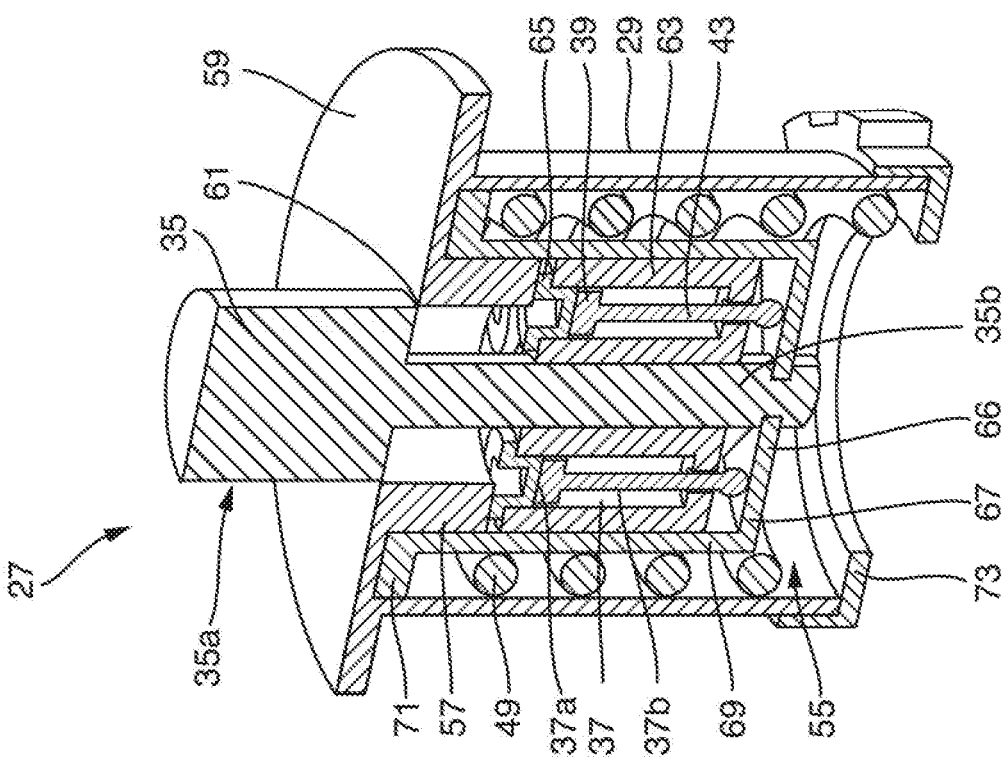
FIG. 4 shows a perspective cross-sectional view of a latching device according to a second embodiment of the present invention.

FIG. 4 shows a schematic cross-sectional view of a second embodiment of a latching device 27 according to the present invention. The principle of operation of the latching device 27 is the same as in the first embodiment. However, different from the first embodiment the support structure 29 defines a large cylindrical interior space 55 into which only a short central inner portion 57 in the form of a hollow cylinder extends from an integral plate portion 59. In the extended position illustrated in FIG. 4 an enlarged diameter section 35a of the latching bolt 35 fully extends from an opening 61 provided in the plate portion 59, and in the retracted position the section 35a is at least partially positioned within the central inner portion 57.

Instead of the outer cylinder portions 33 of the first embodiment, the second embodiment comprises a plurality of—in the example shown—six linear hydraulic actuators 47 inside the interior space 55, which are arranged around a reduced diameter section 35b of the latching bolt 35 in the same symmetrical manner described in detail above for the first embodiment. Each of these linear hydraulic actuators 47 comprises a cup-shaped portion 63 closed at its open end by a closure element 63 to define a cylinder chamber 37 in which a piston 39 is arranged in the same manner as in the case of the linear hydraulic actuators 47 of the first embodiment. Each of the linear hydraulic actuators 47 of the second embodiment also comprises a piston rod 43 which extends from the piston 39, but extends through the bottom of the cup-shaped portion 63. The longitudinal end of the piston rod 43 distal from the piston 39 abuts a respective elongate actuator engagement portion 66, which is fixedly secured to the reduced diameter section 35b and extends with a first radially extending portion 67 engaged by the piston rod 43 perpendicularly with respect to the longitudinal axis 36 of the latching bolt 35 from the reduced diameter section 35b. Each of the engagement portions 66 further comprises a portion 69 extending parallel to the longitudinal axis 36 of the latching bolt 35 from an end of the first radially extending portion 67 opposite the latching bolt 35, and a second radially extending portion 71 which extends perpendicularly with respect to the longitudinal axis 36 of the latching bolt 35 from the end of the portion 69 opposite the portion 67 and away from the latching bolt 35. In an annular space defined between the portions 69 and the support structure 29 a single compression spring 49 is disposed, which is supported between the second radially extending portions 71 and a lower annular spring support plate 73 secured to the support structure 29.

It should be noted that the plurality of actuator engagement portions 66 could also be replaced by a single actuator engagement portion, which is cup-shaped with an upper outwardly extending flange portion. Then the bottom of the cup corresponds to the portions 67, the sidewall of the cup corresponds to the portions 69, and the flange portion corresponds to the portion 71.

In any case, the actuator engagement portion or portions 66 is or are movable with respect to the linear hydraulic actuators and the support structure 29 in the direction of the longitudinal axis 36 of the latching bolt 35, and the compression spring 49, which is arranged around the latching bolt 35 and the arrangement of linear hydraulic actuators 47, applies a force to the actuator engagement portion or portions 66 in the upward direction in FIG. 4. Therefore, the spring 49 again bias the latching bolt 35 into the extended position thereof and constitute a biasing arrangement. Due to the abutment of the piston rods 43 of all of the linear hydraulic actuators 47 on the actuator engagement portion or portions 66 the linear hydraulic actuators 47 are operable to force the actuator engagement portion or portions 66 and the latching bolt 35 secured thereto downwardly in FIG. 4 to move the latching bolt 35 into the retracted position. In the example shown, the piston rods 43 merely abut the actuator engagement portion or portions 66, so that the linear hydraulic actuators 47 are not operable to assist movement of the latching bolt 35 into the extended position. Rather, this movement has to be effected by the spring 49 alone. Thus, the linear hydraulic actuators 47 may be single acting hydraulic actuators in the second embodiment. However, it would also be possible to secure the piston rods 43 to the actuator engagement portion or portions 66 and to utilize double acting linear hydraulic actuators 47, as in the case of the first embodiment.

Otherwise the linear hydraulic actuators 47 are operated and arranged in the same manner as described in detail above for the linear hydraulic actuators 47 of the first embodiment. Thus, they are also divided into the two groups 47a, 47b of linear hydraulic actuators 47 in fluid communication with a different ones of the first connector assembly 38a and the second connector assembly 38b.

Figure 5:
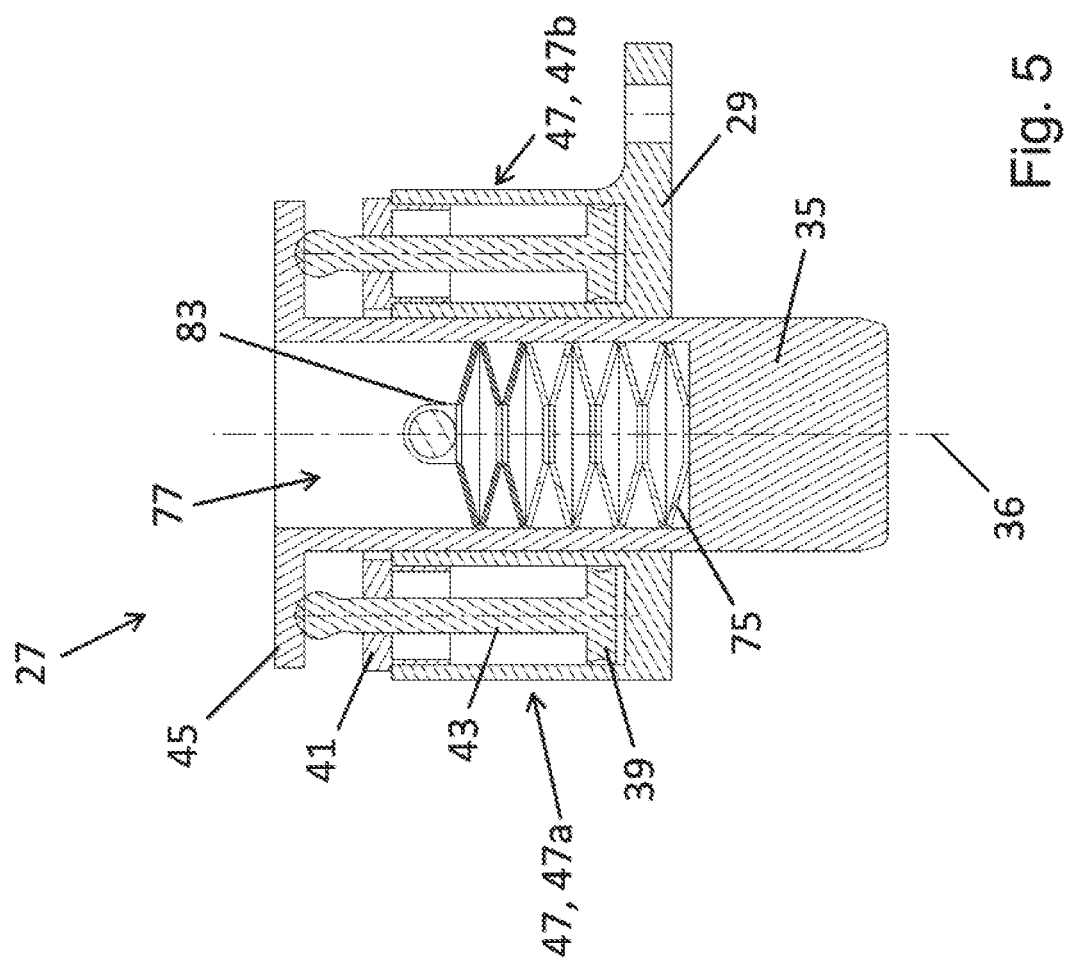
FIG. 5 shows a cross-sectional view of a latching device according to a third embodiment of the present invention.

FIG. 5 shows a schematic cross-sectional view of a third embodiment of a latching device 27 according to the present invention, which is very similar to the latching device 27 of the first embodiment. Different from the first embodiment the coupling plate 45 is integrally formed in one piece with the latching bolt 35, the piston rods 43 merely abut the coupling plate 45, and the latching bolt 35 comprises an elongate cylindrical recess 77 extending from an opening in the coupling plate along the longitudinal axis 36 of the latching bolt 35. A plurality of interconnected Belleville washers 75, which are located one on top of the other, is arranged inside the recess 77. Further, a pin 81 extends radially inwardly from the central hollow cylinder portion 31 of the support structure 29 through a slot 83 in the latching bolt 35, so that the pin 83 compresses the plurality of Belleville washers 75 when moving the latching bolt 35 from the extended position shown in FIG. 5 into the retracted position by operating the linear hydraulic actuators 47 in the manner described above with respect to the first embodiment.

Consequently, the Belleville washers 75 constitute a spring 49 which applies a force to the latching bolt 35 in the downward direction in FIG. 5. The spring 49 therefore biases the latching bolt 35 into the extended position thereof and constitute a biasing arrangement.

In the example shown, the piston rods 43 merely abut the actuator engagement portion constituted by the integral coupling plate 45, so that the linear hydraulic actuators 47 are not operable to assist movement of the latching bolt 35 into the extended position, similar to the case of the second embodiment. Rather, this movement has to be effected by the spring 49 alone. Thus, the linear hydraulic actuators 47 may be single acting hydraulic actuators in the third embodiment. However, it would also be possible to secure the piston rods 43 to the coupling plate 45 and to utilize double acting linear hydraulic actuators 47, as in the case of the first embodiment.

Otherwise the linear hydraulic actuators 47 are operated and arranged in the same manner as described in detail above for the linear hydraulic actuators 47 of the first embodiment. Thus, they are also divided into the two groups 47a, 47b of linear hydraulic actuators 47 in fluid communication with a different one of the first connector assembly 38a and the second connector assembly 38b.

Figure 6B:
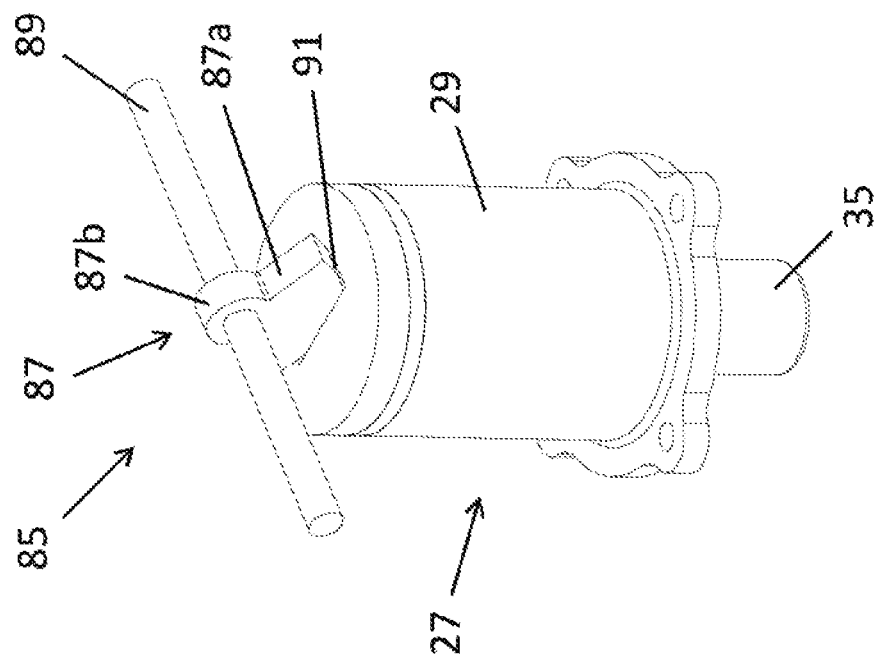
FIG. 6b shows a perspective view of the latching arrangement of FIG. 6a in a latched position.
Figure 6A:
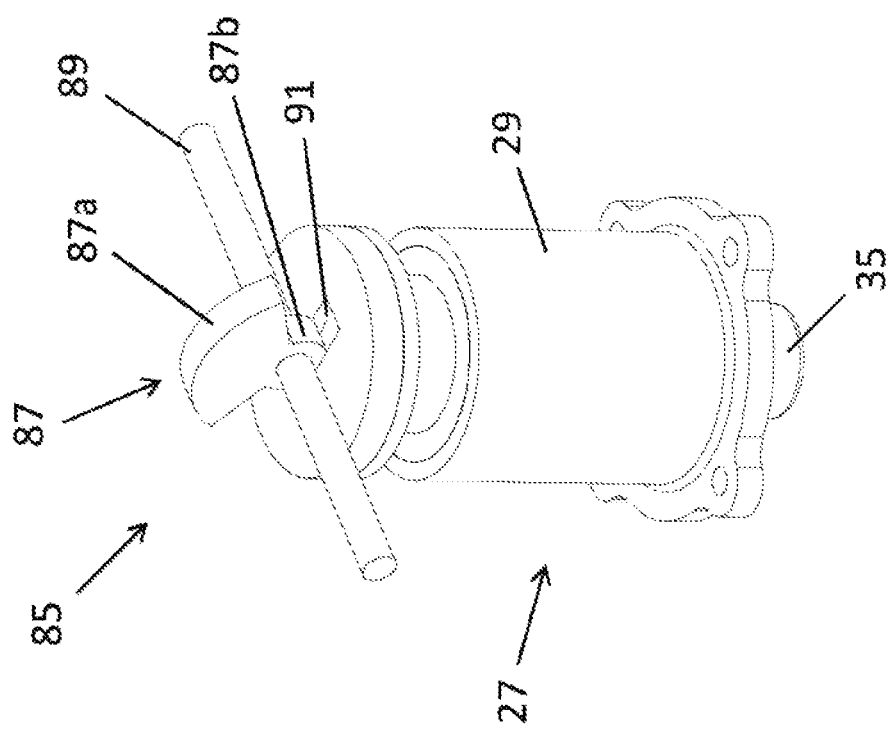
FIG. 6a shows a perspective view of a latching arrangement for a latching device according to the present invention in an unlatched position.

FIGS. 6a and 6b schematically show a locking mechanism 85 for a latching device 27, which latching device 27 itself is illustrated only very schematically with some main components thereof, namely the coupling plate 45, the support structure 29 and the latching bolt 35. The latching device 27 is shown in the retracted position in FIG. 6a and the extended position in FIG. 6b. The locking mechanism 85 comprises a locking element 87 which is connected to a rotatable shaft 89 such that it asymmetrically and radially projects therefrom. More specifically, the locking element 87 integrally comprises a cam portion 87a and an annular retaining portion 87b. The locking element 87 is mounted on the shaft 89 such that the shaft 89 extends through the annular retaining portion 87b. The cam portion 87a radially extends further from the rotatable shaft 89 than the remainder of the locking element 87. The rotatable shaft 89 extends above the coupling plate 45 (in the orientation shown in FIGS. 6a and 6b) and perpendicularly with respect to the longitudinal axis 36 of the latching bolt 35 such that it is spaced from the coupling plate 45, both in the retracted and in the extended positions of the latching bolt 35. By rotating the locking shaft 89 the locking element 87 can be likewise rotated to move the cam portion 87a between the upper position shown in FIG. 6a and the lower position shown in FIG. 6b. Thus, in the position of the locking element 87 and its cam portion 87a shown in FIG. 6a the latching bolt 35 is able to move upwardly into the retracted position due to the spacing between the coupling plate 45 and the locking shaft 89 until a downwardly directed section of the annular portion 87b of the locking element 87 enters into an elongate recess 91 provided in the upper surface of the coupling plate 45 and abuts the coupling plate 45 therein. By contrast, in the position of the locking element 87 and its cam portion 87a shown in FIG. 6b the cam portion 87a of the locking element 87 "fills" the increased distance between the coupling plate 45 and the locking shaft 89 and abuts the coupling plate 45 in the recess 91, such that the latching bolt 35 is prevented from moving out of the extended position.

Consequently, the locking element 87 is selectively movable between a locking position (FIG. 6b) and an enabling position (FIG. 6a). When the latching bolt 35 is in the extended position and the locking element 87 is moved from the enabling position to the locking position the locking element 87 engages the coupling plate 45 and prevents the latching bolt 35 from moving out of the extended position. Conversely, when the latching bolt 35 is in the extended position and the locking element 87 is moved from the locking position to the enabling position it no longer prevents the latching bolt 35 from moving from the extended position into the retracted position. The rotation of the locking shaft 89 is effected by a corresponding actuator (not shown).

A latching device is disclosed for a wing arrangement (3) for an aircraft (1), which wing arrangement (3) includes a wing (9) comprising a base section (11) and an outboard tip section (13) connected base section (11) to be pivotable between a deployed position and a stowed position in which the spanwise length of the wing (9) is smaller than in the deployed position. The latching device (27) comprises a support structure (29), a latching bolt (35) having a longitudinal axis (36) and being slidably supported by the support structure (29) such that the latching bolt (35) is movable between a retracted position and an extended position. In the extended position the latching bolt (35) extends further from the support structure (29) than in the retracted position. The latching device (27) further comprises at least one first hydraulic actuator (47a) and at least one first connector assembly (38a) adapted to be connected to a first hydraulic system of an aircraft (1) and to supply the at least one first hydraulic actuator (47a) with pressurized hydraulic fluid, and at least one second hydraulic actuator (47b) and at least one second connector assembly (38b) adapted to be connected to a second hydraulic system of an aircraft (1) and to supply the at least one second hydraulic actuator (47b) with pressurized hydraulic fluid. The at least one first connector assembly (38a) is separated from the at least one second connector assembly (38b). The at least one first hydraulic actuator (47a) and the at least one second hydraulic actuator (47b) are adapted to effect movement of the latching bolt (35) from the extended position into the retracted position independent of the other one of the at least one first hydraulic actuator (47a) and the at least one second hydraulic actuator (47b).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A latching device for a wing arrangement for an aircraft, which wing arrangement includes a wing comprising:
   a base section having a first end portion adapted to be secured to the fuselage of an aircraft and an opposite second end portion, and
   a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position,
   wherein the latching device comprises:
   a support structure,
   a latching bolt having a longitudinal axis and being slidably supported by the support structure such that the latching bolt is movable between a retracted position and an extended position, wherein in the extended position the latching bolt extends further from the support structure than in the retracted position, at least one first hydraulic actuator, and
   at least one first hydraulic actuator and at least one first connector assembly adapted to be connected to a first hydraulic system of an aircraft and to supply the at least one first hydraulic actuator with pressurized hydraulic fluid, and at least one second hydraulic actuator and at least one second connector assembly adapted to be connected to a second hydraulic system of an aircraft and to supply the at least one second hydraulic actuator with pressurized hydraulic fluid, wherein the at least one first connector assembly is separated from the at least one second connector assembly, wherein the at least one first hydraulic actuator and the at least one second hydraulic actuator are each configured to move the latching bolt from the extended position into the retracted position independent of the other one of the at least one first hydraulic actuator and the at least one second hydraulic actuator.

2. The latching device according to claim 1, comprising a plurality of the first hydraulic actuators and a plurality of the second hydraulic actuators.

3. The latching device according to claim 1, further comprising a biasing arrangement, which is arranged and adapted to bias the latching bolt into the extended position.

4. The latching device according to claim 3, wherein each of the at least one first hydraulic actuator and each of the at least one second hydraulic actuator is a single acting hydraulic actuator.

5. The latching device according to claim 1, wherein each of the at least one first hydraulic actuator and each of the at least one second hydraulic actuator is a double acting hydraulic actuator, wherein the at least one first hydraulic actuator and the at least one second hydraulic actuator are configured to move the latching bolt from the retracted position into the extended position independent of the other one of the at least one first hydraulic actuator and the at least one second hydraulic actuator.

6. The latching device according to claim 1, wherein the latching bolt comprises or is fixedly attached to at least one hydraulic actuator engagement portion which is extending transversely with respect to the longitudinal axis, wherein each of the at least one first hydraulic actuator and each of the at least one second hydraulic actuator engages or is secured to at least one of the at least one hydraulic actuator engagement portion to thereby effect the movement of the latching bolt upon actuation of the at least one first hydraulic actuator or the at least one second hydraulic actuator.

7. The latching device according to claim 1, further comprising:
at least one locking mechanism having a locking element which is selectively movable between a locking position and an enabling position, wherein when the latching bolt is in the extended position and the locking element is moved from the enabling position to the locking position the locking element engages the latching bolt or a component secured thereto and prevents the latching bolt from moving out of the extended position, and when the latching bolt is in the extended position and the locking element is moved from the locking position to the enabling position the latching bolt is able to move from the extended position into the retracted position.

8. The latching device according to claim 7, wherein the at least one locking mechanism further comprises a locking actuator operable to move the at least one locking element between the locking position and the enabling position.

9. A wing arrangement for an aircraft, comprising:
a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the distance between the first end portion and the fourth end portion is smaller than in the deployed position, at least one latching device according to claim 1, wherein the at least one first connector assembly of each of the at least one latching device is connected or connectable to a first hydraulic system of an aircraft and the at least one second connector assembly of each of the at least one latching device is connected or connectable to a second hydraulic system of an aircraft, wherein, for each of the at least one latching device, the support portion of the respective latching device is secured to one of the second end portion and the third end portion and the other of the second end portion and the third end portion comprises a first bore or a second bore which are arranged such that in the deployed position of the tip section the first bore is aligned with the latching bolt of the respective latching device such that the latching bolt is movable into engagement with the first bore by moving it into the extended position and out of engagement with the first bore by moving it into the retracted position, or in the stowed position of the tip section the second bore is aligned with the latching bolt of the respective latching device such that the latching bolt is movable into engagement with the second bore by moving it into the extended position and out of engagement with the second bore by moving it into the retracted position, and wherein when the latching bolt is in engagement with the first bore it prevents movement of the tip section out of the deployed position, and when the latching bolt is in engagement with the second bore it prevents movement of the tip section out of the stowed position.

10. An aircraft comprising a fuselage, a wing arrangement according to claim 9, wherein the first end portion of the base section is attached to the fuselage and the base section is arranged between the fuselage and the tip section, and a first hydraulic system and a separate second hydraulic system, wherein the at least one first connector assembly of the at least one first hydraulic actuator is connected to the first hydraulic system and the at least one second connector assembly of the at least one second hydraulic actuator is connected to the second hydraulic system.

11. The aircraft according to claim 10, wherein the first hydraulic system is operable to supply a plurality of consumers of the aircraft with pressurized hydraulic fluid, and the second hydraulic system is operable to supply a plurality of actuators of the aircraft with pressurized hydraulic fluid.

12. A latching device for a wing arrangement for an aircraft, which wing arrangement includes a wing comprising:
a base section having a first end portion adapted to be secured to the fuselage of an aircraft and an opposite second end portion, and
a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position,
wherein the latching device comprises:
a support structure, a latching bolt having a longitudinal axis and being slidably supported by the support structure such that the latching bolt is movable between a retracted position and an extended position, wherein in the extended position the latching bolt extends further from the support structure than in the retracted position, at least one first hydraulic actuator, and a plurality of first hydraulic actuators each connected to a corresponding first connector assembly which connects the first hydraulic actuator to a first hydraulic system of an aircraft to supply the first hydraulic actuator with pressurized hydraulic fluid, and wherein the plurality of first hydraulic actuators are symmetrically arranged around the longitudinal axis of the latching bolt with an angular distance between each two adjacent first hydraulic actuators being the same, and a plurality of second hydraulic actuators each connected to a corresponding second connector assembly which connects the second hydraulic actuator to a second hydraulic system of the aircraft to supply the second hydraulic actuator with pressurized hydraulic fluid, wherein the first connector assembly is separated from the second connector assembly, and wherein the plurality of second hydraulic actuators are symmetrically arranged around the longitudinal axis of the latching bolt with an angular distance between each two adjacent second hydraulic actuators being the same, and wherein the plurality of first hydraulic actuators and the plurality of the second hydraulic actuators are each configured to move the latching bolt from the extended position into the retracted position independent of the other plurality of the first hydraulic actuators or the hydraulic actuators.

13. A latching device for a wing arrangement for an aircraft, which wing arrangement includes a wing comprising:

a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position, wherein the latching device comprises:

a support structure, a latching bolt having a longitudinal axis and being slidably supported by the support structure such that the latching bolt is movable between a retracted position and an extended position, wherein in the extended position the latching bolt extends further from the support structure than in the retracted position, at least one first hydraulic actuator and at least one first connector assembly adapted to be connected to a first hydraulic system of an aircraft and to supply the at least one first hydraulic actuator with pressurized hydraulic fluid, and at least one second hydraulic actuator and at least one second connector assembly adapted to be connected to a second hydraulic system of an aircraft and to supply the at least one second hydraulic actuator with pressurized hydraulic fluid, wherein the at least one first connector assembly is separated from the at least one second connector assembly, wherein the at least one first hydraulic actuator and the at least one second hydraulic actuator are adapted to effect movement of the latching bolt from the extended position into the retracted position independent of the other one of the at least one first hydraulic actuator and the at least one second hydraulic actuator, and a biasing arrangement comprises springs, wherein for each of the at least one first hydraulic actuator and for each of the at least one second hydraulic actuator, one of the springs is located inside a cylinder chamber of a cylinder of the respective hydraulic actuator and supported between a piston of the respective hydraulic actuator and a spring support portion of the cylinder, one of the springs is located surrounding a portion of the latching bolt and supported between a first spring support portion fixedly connected to the latching bolt and a second spring support portion which is immovable with respect to the support structure, or a spring of the at least one spring is located inside a recess provided in the latching bolt and extending from one longitudinal end of the latching bolt and supported between a bottom of the recess opposite the longitudinal end and a spring support portion which is immovable with respect to the support structure.

* * * * *